3,281,501
LOW PRESSURE ISOTACTIC POLYPROPYLENE DILUTED WITH LOW PRESSURE LINEAR POLYETHYLENE

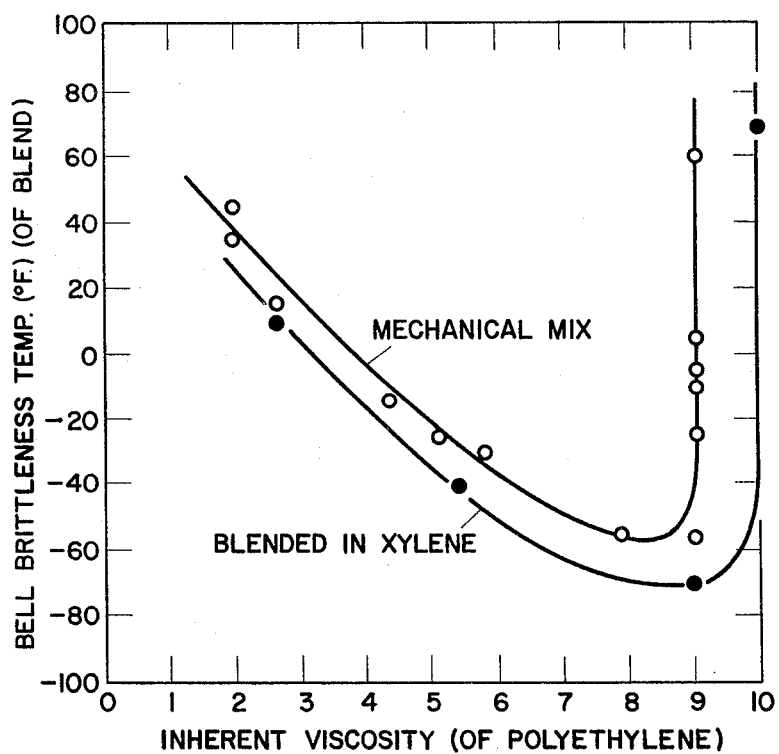
George M. Coats
Anthony J. Passannante
Gabriel Karoly      Inventors
Joseph M. Kelley, Jr.
Walter E. Heumann
By  L. Chasan  Patent Attorney

George M. Coats, Cranford, Anthony J. Passannante, Metuchen, Gabriel Karoly, Elizabeth, Joseph M. Kelley, Jr., Westfield, and Walter E. Heumann, Jersey City, N.J., assignors to Esso Research and Engineering Company, a corporation of Delaware
Filed Mar. 31, 1960, Ser. No. 19,109
The portion of the term of the patent subsequent to August 20, 1982, has been disclaimed
4 Claims. (Cl. 260—897)

This invention relates to an improvement in the low temperature and impact resistance characteristics of polypropylene plastics. More particularly, it relates to low pressure isotactic polypropylene diluted with controlled amounts of linear polyethylene of controlled inherent viscosity.

In the recent past so-called "low pressure" polypropylene has been attracting increasing attention as a plastic competitive with polyethylene. This polymer has been prepared by the now well-known process of polymerizing propylene with catalyst systems made up of reducible, heavy, transition metal halides and a reducing, metal-containing compound to high density, isotactic, high molecular weight, solid, relatively linear products. One of the drawbacks of such "low pressure" polypropylene plastics has been their excessive brittleness at low temperatures. In particular, this has tended to limit their utility as a packaging material for frozen foods, wire and cable insulation, plastic pipe and bottles, etc. Low temperature brittleness is commonly measured by the Bell Brittleness Temperature Test (ASTM Test D–746). Impact resistance (ASTM Test D–256) which is another form of brittleness measurement, represents a similar problem.

It had been proposed to add polyethylene to the polypropylene to improve these properties. Excessive amounts, i.e., more than 70% polyethylene, had been thought to be necessary. In addition, forming homogenous blends of compositions of that nature presented difficulties in mixing.

It has now been found that the low temperature properties of the low pressure polypropylene are improved by diluting it with low pressure linear polyethylene or a mixture of linear polyethylenes so that the polyethylene constitutes from 15 to 50 wt. percent of the composition. The resulting compositions have a Bell Brittleness Temperature as low as −90° F. with other important properties such as tensile strength, hardness and stiffness maintained at high levels.

The low pressure isotactic polypropylene polymer can have inherent viscosities in the range of from 1.2–4.0. The polymers have a high degree of crystallinity and a low solubility in n-heptane. The density is in the range of 0.86 to 0.91 and the crystallinity from 50 to 90%.

The low pressure linear polyethylene has a corresponding molecular weight in the range of about 600,000 to 1,500,000, a density in the range of 0.920 to 0.970 and an inherent viscosity of from 3 to 9. This viscosity determination is made in tetralin at 125° C. The high pressure process branched polyethylenes are not effective. Blends of such high pressure polyethylene with low pressure polypropylene at a 40 wt. percent polyethylene addition level have Bell Brittleness values of greater than 70° F. The preferred addition level of the linear polyethylene is from 25 to 40 wt. percent and the preferred inherent viscosity range is from 5 to 8.

For the purpose of convenience details of the low pressure catalytic process particularly for polypropylene are presented below, although it should be realized that these by themselves constitute no part of this invention. The process is generally described in the literature, e.g. see U.K. Patent 810,023, and "Scientific American," September, 1957, pages 98 et seq.

In the process the polymers are prepared by polymerizing the monomer with the aid of certain polymerization catalysts. The catalysts are solid, insoluble reaction products obtained by partially reducing a heavy metal compound usually the halide of a Group IV–B, V–B and VI–B metal of the Periodic System, such as vanadium tetrachloride, or a titanium halide, e.g. $TiCl_4$, $TiBr_4$, etc., preferably with metallic aluminum. The preferred catalyst of this type is usually prepared by reducing 1 mole of titanium tetrahalide, usually tetrachloride, with about one-third mole of aluminum to give a material corresponding to $TiCl_3 \cdot 0.33AlCl_3$, thus containing cocrystallized $AlCl_3$. (For further details see U.S. Patents 3,128,252 and 3,032,513). The product is then activated with an aluminum alkyl compound corresponding to the formula RR'ALX. In this formula R, R' and X preferably are alkyl groups of 2 to 8 carbon atoms, although X may alternatively be hydrogen or a halogen, notably chlorine. Typical examples of the aluminum alkyl compounds are aluminum triethyl, aluminum sesquichloride, aluminum triisobutyl, etc.

The monomers are then contacted with the resulting catalyst in the presence of inert hydrocarbon solvents such as isopentane, n-heptane, xylene, etc. The polymerization is conveniently effected at temperatures of about 0° to 100° C. and pressures ranging from about 0 to 500 p.s.i.g., usually 0 to 100 p.s.i.g. The catalyst concentration in the polymerization zone is preferably in the range of about 0.1 to 0.5% based on total liquid and the polymer product concentration in the polymerization zone is preferably kept between about 2 to 15% based on total contents so as to allow easy handling of the polymerized mixture. The proper polymer concentration can be obtained by having enough of the inert diluent present or by stopping the polymerization short of 100% conversion. When the desired degree of polymerization has been reached, a $C_1$ to $C_8$ alkanol such as isopropyl alcohol or n-butyl alcohol, desirably in combination with a chelating agent for deashing such a acetylacetone is normally added to the reaction mixture for the purpose of dissolving and deactivating the catalyst and for precipitating the polymer product from solution. After filtration, the solid polymer may be further washed with alcohol or acid such as hydrochloric acid, dried, compacted and packaged.

The mixing of the polymers can be done in the conventional manner, as by milling, extruding, Banbury mixing and other known procedures.

They can also be blended by an improved method which is based on the mixing of the polymer in solution or swollen at elevated temperatures, and followed by precipitation.

It is to be understood that the term "low pressure" polymer as used herein connotes material prepared in the indicated manner.

This invention and its advantages will be better understood by reference to the following examples.

Example 1

Low pressure polypropylene, prepared in accordance with the description was diluted with 40 wt. percent low pressure linear polyethylene of 0.940 density with an inherent viscosity of 8. This particular blend of these materials possessed a Bell Brittleness Temperature of −55° F. and an unnotched impact resistance (ASTM Test-256-Izod type test) of greater than 16 ft. lb./in. at −80° F.

Example 2

The inherent viscosity of the polyethylene samples were varied, to demonstrate effect on low temperature properties. The results are shown in the graph in the drawing. The formulations blended in xylene were prepared according to the method summarized previously.

This graph demonstrates that greatly improved low temperature properties were obtained when polypropylene was blended with low pressure polyethylene having an inherent viscosity in the preferred region of from 5 to 8.

Example 3

Dilution of polypropylene with the preferred linear polyethylene results in a blend of materials with outstanding low temperature properties while other physical properties are maintained at high levels. This is shown in the following table.

| Material | Unnotched Impact Energy [1] (ft. lb./in.) | | | Bell Brittleness [2] Temp. (° F.) | Yield Tensile Str. @ 2 in./min. (p.s.i.) | Flexural Stiffness [3] (p.s.i.) | Rockwell Hardness R-Scale |
|---|---|---|---|---|---|---|---|
| | @ 73° F. | @ 0° F. | @ −80° F. | | | | |
| 100% Polypropylene (inherent viscosity 2.8) | >16 | 5.2 | 4.0 | 65 | 4,700 | 110,000 | 90 |
| 40 wt. percent linear polyethylene (inherent viscosity −5.0) in polypropylene (inherent viscosity −2.8) | >16 | >16 | >16 | −25 | 4,000 | 87,000 | 77 |

[1] ASTM Test 256.
[2] ASTM Test D-746.
[3] ASTM Test D-747.

The advantages of this invention will be apparent to those skilled in the art. Improvements in the low temperature properties of the products are obtained in an efficient and economical manner. The other important properties of the subject blends, such as tensile, stiffness and hardness, are maintained at high levels as opposed to the severe losses occurring when other low temperature blending materials, such as elastomers and plasticizers are employed. In addition the melting point of the subject blends is as high as the melting point of polypropylene.

It is to be understood that this invention is not limited to the specific examples which have been offered merely as illustrations and that modifications may be made without departure from the spirit of the invention.

What is claimed is:

1. A composition of matter of improved low temperature characteristics comprising a low pressure linear polyethylene diluted with low pressure isotactic polypropylene, said polyethylene constituting from 15 to 50 wt. percent of the composition and having an inherent viscosity of from 3 to 9.

2. The composition of claim 1 in which the polyethylene is utilized in an amount of from 25 to 40 wt. percent.

3. A composition of matter of improved low temperature characteristics comprising: a major proportion of a low pressure isotactic polypropylene and a minor proportion of a low pressure linear polyethylene, said polyethylene being present in an amount in the range of about 25 to 40 wt. percent of the composition and having an inherent viscosity of from 5 to 8.

4. A composition of matter comprising a blend of isotactic polypropylene with linear polyethylene, said polyethylene constituting from about 15 to 50 weight percent of the composition and having a molecular weight above about 500,000.

References Cited by the Examiner

UNITED STATES PATENTS

| | | | |
|---|---|---|---|
| 2,692,258 | 10/1954 | Roebuck et al. | 260—897 |
| 2,727,024 | 12/1955 | Field et al. | 260—897 |
| 2,882,263 | 4/1959 | Natta et al. | 260—93.7 |
| 2,928,756 | 3/1960 | Campbell | 260—897 |
| 2,950,267 | 8/1960 | Thompson et al. | 260—897 |
| 2,956,042 | 10/1960 | Underwood et al. | 260—897 |
| 2,983,704 | 5/1961 | Roedel | 260—897 |

MURRAY TILLMAN, *Primary Examiner.*

LEON J. BERCOVITZ, DANIEL ARNOLD, *Examiners.*

J. A. KOLASCH, R. N. COE, E. B. WOODRUFF,
*Assistant Examiners.*